United States Patent [19]

Tambor

[11] 3,847,308

[45] Nov. 12, 1974

[54] ROLLING DIAPHRAGM WITH LATERAL SUPPORT

[75] Inventor: Ronald Tambor, Maplewood, N.J.

[73] Assignee: Thiokol Chemical Corporation, Bristol, Pa.

[22] Filed: Oct. 10, 1966

[21] Appl. No.: 586,011

[52] U.S. Cl. ............................................ 222/386.5
[51] Int. Cl. ............................................. B67d 5/54
[58] Field of Search .......... 222/95, 386.5; 158/50.1; 239/323

[56] References Cited
UNITED STATES PATENTS 2,970,452   2/1961   Beckman et al. ............. 222/386.5 X
3,070,265   12/1962  Everett ............................ 222/386.5
3,296,803   1/1967   Kroekel ................................ 60/259

Primary Examiner—Verlin R. Pendegrass

[57] ABSTRACT

This disclosure relates to a tank having a rolling diaphragm therein for expelling fluid therefrom. In the illustrated embodiment the rolling diaphragm is a lining in said tank having a flexible sleeve which rolls inside out when a piston at one end is actuated by a motive fluid. The improvement resides in an annular strut located intermediate the ends of the sleeve for supporting the latter against collapse inwardly and slidable along the sleeve with the piston during a rolling operation.

7 Claims, 4 Drawing Figures

PATENTED NOV 12 1974

3,847,308

INVENTOR.
RONALD TAMBOR

BY Curtis, Morris + Safford

ATTORNEYS

ROLLING DIAPHRAGM WITH LATERAL SUPPORT

The present invention relates to a tank for storing and discharging fluids and more particularly to an improved construction for positively expelling fluid from the tank.

Constructions have heretofore been proposed having a "rolling diaphragm" for positively discharging fluids from tanks. Such rolling diaphragms usually comprise a cylindrical sleeve of a thin flexible material at the interior of a tank with one end of the sleeve attached to the tank and the opposite end formed as or attached to a piston slidable in the tank. Such devices are operated by supplying a motive fluid under pressure between the piston and the end of the tank to actuate the piston along the tank and expel fluid from its opposite end. During movement of the piston along the tank the flexible diaphragm attached thereto rolls back on itself.

Such rolling diaphragms avoid the use of ring type seals on a piston and in some constructions prevents contact of the fluid with the tank walls. However, such rolling diaphragms of conventional construction permit sloshing of the liquid, due to ullage requirements, and are apt to produce an impact and shock on the tank when the pressure of the motive fluid is initially applied and the movement of the liquid is suddenly stopped. Also such rolling diaphragms present certain design limitations. For example, if the diaphragm is made flexible enough to roll back on itself, it does not have the hoop strength required to resist collapse by the motive fluid acting radially inward between the diaphragm and vessel wall. Thus, as the tank is increased in length the wall of the diaphragm must be made thicker to resist collapse which reduces its flexibility and ability to roll back on itself. Even then the length of the diaphragm is materially limited.

One of the objects of the present invention is to provide improved constructions in a storage tank which supports a rolling diaphragm against lateral collapse without interfering with its rolling operation.

Another object is to provide an improved rolling diaphragm construction which permits complete incapsulation of the fluid in the tank so that it will not directly contact the tank wall and baffles the flow of liquid in the tank to reduce the impact and shock resulting from sloshing liquid.

Still another object is to provide an apparatus of the type indicated which is of simple and compact construction, economical to manufacture and one which is reliable in operation.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims. In the drawings:

Figure 1:
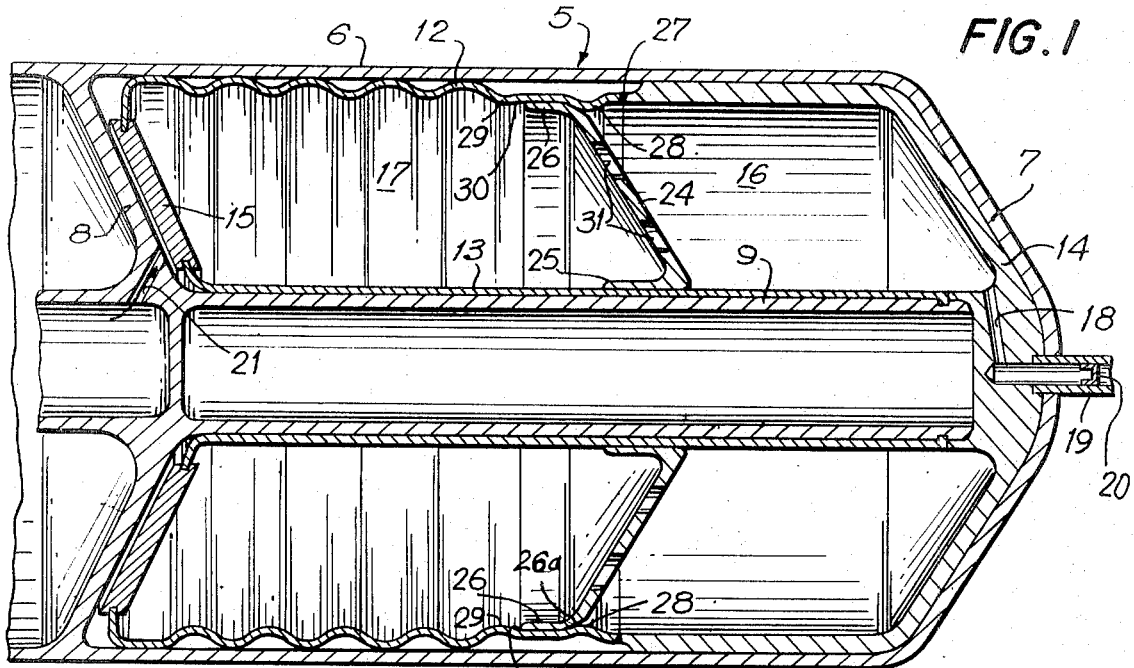
FIG. 1 is a sectional view of a fluid storage tank incorporating the present invention and showing the combined annular strut and baffle extending between the inner and outer diaphragm sleeves for supporting them intermediate their ends and damping the flow of liquid longitudinally of the tank.

For purposes of illustration, the invention is shown applied to a tank 5 having a cylindrical wall 6, end walls 7 and 8 and an axial support 9. In the illustrated embodiment the tank 5 constitutes one stage of a rocket engine for storing a liquid propellant in the annular space between the outer and inner walls 6 and 9. It will be understood, however, that the tank 5 may have other uses and that the outer and inner walls 6 and 9 may have other shapes than the cylindrical shape shown.

In accordance with the present invention the vessel 6 is completely lined to encapsulate the liquid propellant and provide an hermetic seal between the fluid and walls of the tank as well as providing a rolling diaphragm for expelling the liquid propellant. The lining is in the form of an outer sleeve 12 and inner sleeve 13 adjacent the outer and inner walls 6 and 9 of the tank and end walls 14 and 15 at the ends of the sleeves. Also the lining is made up of a section 16 having a rigid end wall 14 and adjacent portion of the outer sleeve 12 and shaped to closely fit the contour of the end wall 7 and an adjacent portion of the cylindrical tank wall 6; and a flexible section 17 adjacent the remainder of the outer and inner walls 6 and 9 of the vessel. The end wall 15 of the diaphragm is in the form of a piston attached to the ends of the outer and inner sleeves 12 and 13. The end wall 14 of the rigid lining section 16 has an outlet port 18 spaced from the tank 5 by an axial sleeve 19 and the outlet port 18 is normally closed by a cup shaped plug which is blown out when subjected to pressure. The end wall 8 of the tank 12 has an inlet port 21 for supplying a motive fluid under pressure between it and the piston 15. Thus, the tank 5 may be made of a material having substantial strength even though it is incompatible with the fluid being stored as the fluid is completely incapsulated in the lining.

The rigid section 16 of the lining may extend for substantially one half the length of the tank 5 and is sufficiently stiff to resist buckling while the section 17 is sufficiently flexible to adapt it to roll back on itself and into the rigid section. In addition, the outer sleeve 12 of the flexible section 17 is corrugated which strengthens the wall against buckling.

Figure 2:
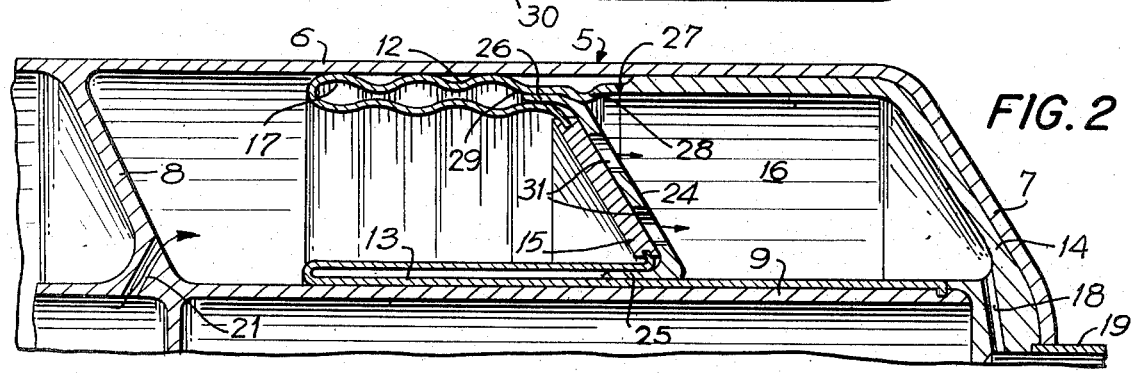
FIG. 2 is a sectional view of the upper half of the storage vessel illustrated in FIG. 1 and showing the inner and outer diaphragm sleeves rolled back on themselves and the piston engaging the transverse strut.
Figure 3:
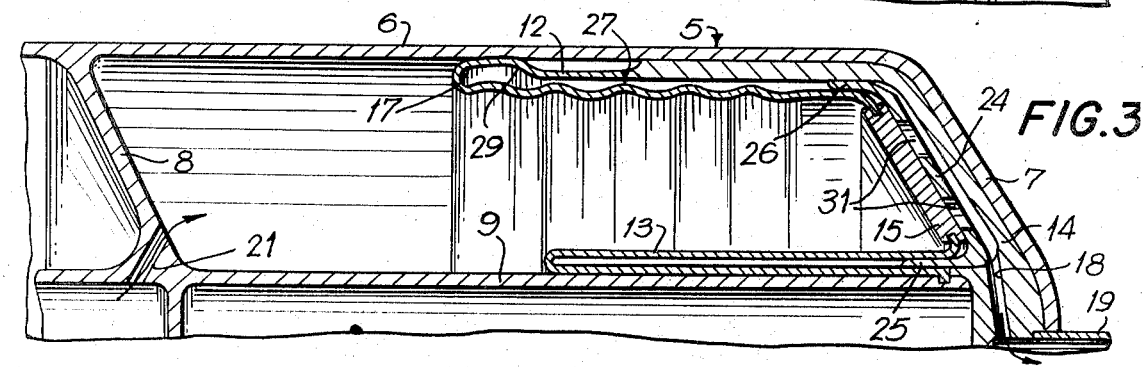
FIG. 3 is a view similar to FIG. 2 showing the inner and outer diaphragms rolled back on themselves to a position where the strut has been moved by the piston into engagement with the end wall of the tank.
Figure 4:
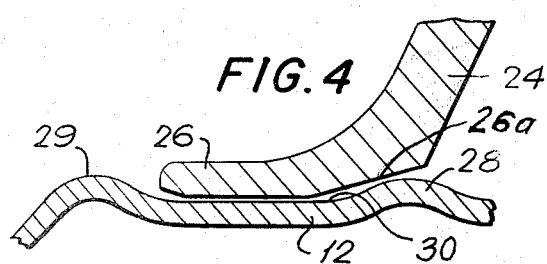
FIG. 4 is a detailed sectional view showing the manner of which the strut is initially retained in position in the tank.

The flexible section 17 of the wall is further supported against buckling by a strut 24 extending between the outer diaphragm sleeve 12 and inner diaphragm sleeve 13. The strut 24 in the illustration embodiment is in the form of a conical disc corresponding to the shape of the end walls 7 and 14 of the tank and lining. Conical strut 24 has an inner axial flange 25 constituting a hub surrounding the inner sleeve 13 of the diaphragm on which it is adapted to slide and an outer flange 26 which bears against the outer sleeve 12 of the flexible section 17. The flexible section 17 of the lining may be integrally connected to the rigid section 16 or by a circular seam 27, and adjacent the seam the flexible section is dimpled at 28 and 29 to provide an annular recess 30 therebetween in which the outer peripheral flange 26 of the strut 24 seats to initially hold it in the position illustrated in FIG. 1. However, the outer flange 26 of the strut 24 has an inclined surface 26a adjacent the dimple 28 for guiding the flange over the latter as the strut moves from the position shown in FIG. 2 to that shown in FIG. 3. The web of the disc strut 24 has perforations 31 therein which initially damp the flow of liquid therethrough to prevent shock by a sudden stopping of the flow, but permit controlled flow until the strut is engaged by the piston 15. Piston 15 has a diameter less than the space between the inner and outer flanges 25 and 26 of the strut 24 so that it may nest in and closely fit the rearward face of the strut 24 as shown in FIGS. 2 and 3. Only one strut 24 is shown in the illustrated embodiment, but it will be understood that a plurality of struts may be provided in spaced relation along the flexible sleeves 12 and 13. One form of the invention having now been described in detail the mode of operation is next explained.

For purposes of description let it be assumed that the parts are in the position illustrated in FIG. 1 and that the tank is filled with a propellant liquid incapsulated by the lining. To discharge propellant liquid from the tank 5, a motive fluid is introduced through the inlet port 21 to the space between the piston 15 and end wall 8 of the tank. As the piston 15 starts to move, liquid is propelled forwardly to fill the ullage space and the perforations 31 in the strut permit flow therethrough but damp the flow to prevent shock by the sudden stopping of the flowing liquid. The pressure of the motive fluid is transmitted through the piston and propellant fluid in the tank 5 to blow out the sealing cup 20 and cause fluid to flow from the tank 5 through the outlet port 18. As the piston 15 is actuated from the position shown in FIG. 1 to that shown in FIG. 2 it positively displaces the propellant fluid from the tank 5 and the outer and inner flexible sleeves 12 and 13 of section 17 roll back on themselves until the piston 15 nests in the strut 24 as shown in FIG. 2. During such movement of the piston 15 from the position shown in FIG. 1 to that shown in FIG. 2 the fluid displaced from the space 10 flows through the perforations 31 in the strut 24 at a controlled rate, but the latter supports the diaphragm sleeves 12 and 13 from the axial support 9 at the place where the motive fluid applies the greatest bending moment to prevent collapse of the sleeves. After the piston 15 nests in the strut 24, the two elements then move as a unit from the position shown in FIG. 2 to that shown in FIG. 3 to expel all of the fluid from the tank 5. At the time that the strut 24 is actuated by the piston 15 the dimple 28 in the outer diaphragm yields to permit the inclined surface 26a of flange 26 to slide by from the position shown in FIG. 2 to that shown in FIG. 3.

It will now be observed that the present invention provides an improved rolling diaphragm construction which supports the diaphragm against lateral collapse without interfering with its rolling operation. It will also be observed that the tank lining constituting the rolling diaphragm incapsulates the propellant fluid to prevent it from directly contacting with the walls of the tank. It will still further be observed that the present invention provides a rolling diaphragm for positively expelling fluid from a tank which is of simple and compact construction, economical to manufacture and one which is reliable in operation.

While a single embodiment of the invention is herein illustrated and described, it will be understood that changes may be made in the construction and arrangement of elements without departing from the spirit or scope of the invention. Therefore, without limitation in this respect the invention is defined by the following claims:

I claim:

1. Apparatus for positively expelling fluid from a tank of the type having a rolling diaphragm in said tank and comprising a sleeve of flexible material having one end attached, a piston at its opposite end and adapted to roll back on itself to expel fluid from the tank, the combination with said tank and rolling diaphragm of a transverse strut in said tank separate from the piston and attached end of the rolling diaphragm sleeve and having a peripheral flange engaging the sleeve intermediate its ends to support it against forces tending to buckle it inwardly, and said strut being slidable along the sleeve when engaged by the piston during a rolling operation.

2. Apparatus for positively expelling fluid from a tank having an outer peripheral wall, end walls and an axial support projecting from it at least one end wall, a lining for said tank having walls of a shape conforming to the walls of said tank, said tank containing a fluid hermetically sealed therefrom by said lining, said lining comprising an outer cylindrical sleeve adjacent the peripheral wall of the tank, an inner sleeve around the axial support and a wall connecting one of the ends of the inner and outer sleeves to form a piston, a strut having a hub mounted on the inner sleeve intermediate the ends thereof for sliding movement thereon and a peripheral flange engaging the outer sleeve intermediate its ends to support the inner and outer sleeves from collapsing inwardly, an outlet port in one end wall, and an inlet port in the opposite end wall for supplying a motive fluid between the piston and adjacent end wall of the tank whereby to force fluid through the outlet port, roll the inner and outer diaphragm sleeves back on themselves until the piston engages the strut and move the strut therewith into engagement with the opposite end wall of the tank.

3. An apparatus in accordance with claim 2 in which the strut is in the form of a perforated disc of a shape corresponding to the shape of the end wall and having inner and outer axially extending flanges which bear against the inner and outer sleeves to brace the outer sleeve from the inner sleeve to oppose radially forces tending to buckle the sleeves, and the perforations being of a size and number to control flow therethrough and prevent shock by the sudden stopping of flow.

4. An apparatus in accordance with claim 2 in which the lining has one longitudinal section having rigid walls and another longitudinal section having flexible walls adapted to roll back on themselves.

5. An apparatus in accordance with claim 3 in which the flexible section is corrugated.

6. An apparatus in accordance with claim 2 in which the inner and outer sleeves are cylindrical, the piston is an annular disc and the strut is an annular disc with cylindrical flanges projecting from the same side thereof.

7. An apparatus in accordance with claim 6 in which the end walls of the tank are conical and the piston end strut are conical to closely fit the end walls of the tank.

* * * * *